US012295485B2

(12) United States Patent
Griffin

(10) Patent No.: US 12,295,485 B2
(45) Date of Patent: May 13, 2025

(54) SPACKLE KNIFE HOLSTER

(71) Applicant: Diarmuid Griffin, Woodland Hills, CA (US)

(72) Inventor: Diarmuid Griffin, Woodland Hills, CA (US)

( * ) Notice: Subject to any disclaimer, the term of this patent is extended or adjusted under 35 U.S.C. 154(b) by 0 days.

(21) Appl. No.: 16/525,450

(22) Filed: Jul. 29, 2019

(65) Prior Publication Data

US 2020/0029677 A1 Jan. 30, 2020

Related U.S. Application Data

(60) Provisional application No. 62/711,590, filed on Jul. 29, 2018.

(51) Int. Cl.
*A45F 5/02* (2006.01)
*B25H 3/00* (2006.01)

(52) U.S. Cl.
CPC ............... *A45F 5/021* (2013.01); *B25H 3/00* (2013.01); *A45F 2200/0575* (2013.01)

(58) Field of Classification Search
CPC .... A45F 2200/0575; A45F 5/021; A45F 5/00; A45F 2005/008; A45F 224/183; A45F 224/904; A45F 224/675; A45F 224/222; A45F 206/372; A45F 206/373; Y10S 224/904; A45C 13/02
USPC ......... 224/661, 183, 242, 245; 206/372, 373
See application file for complete search history.

(56) References Cited

U.S. PATENT DOCUMENTS

| | | | | | |
|---|---|---|---|---|---|
| 3,008,617 | A * | 11/1961 | Villwock | F41C 33/0209 | 224/183 |
| 3,212,690 | A * | 10/1965 | Green | A41F 9/002 | 224/576 |
| 4,300,708 | A * | 11/1981 | Pattermann | A45F 5/02 | 224/673 |
| 4,577,787 | A * | 3/1986 | Hersey | F41C 33/0236 | 224/192 |
| 4,828,154 | A * | 5/1989 | Clifton, Jr. | A45F 5/14 | 224/192 |
| 4,917,281 | A * | 4/1990 | Ostermiller | A45F 5/02 | 224/240 |
| 4,986,459 | A * | 1/1991 | Yarbrough, Jr. | A45F 5/02 | 224/195 |
| 5,409,153 | A * | 4/1995 | Ristich | A45C 1/04 | 150/112 |
| 5,682,653 | A * | 11/1997 | Berglof | G09F 1/10 | 24/303 |
| 6,102,266 | A * | 8/2000 | Chacon | A45F 5/00 | 224/661 |
| 6,189,154 | B1 * | 2/2001 | Ducharme | A45F 13/02 | 2/247 |
| 6,457,239 | B1 * | 10/2002 | McLaughlin | B26B 29/025 | 30/151 |
| 6,796,344 | B2 * | 9/2004 | Chen | A45C 1/024 | 150/113 |

(Continued)

*Primary Examiner* — Adam J Waggenspack

(57) ABSTRACT

An apparatus for retaining spatulas or putty knives during non-use by providing a spackle knife holster that removably retains the spatulas with a magnet positioned on an inner wall and preferably separated by one wall. The spackle knife holster further contains a plurality of pockets made of plastic to retain a plurality of spatulas. The apparatus further provides loops and a strap to affix the spackle knife holster to a user's belt loops at a desired angle.

16 Claims, 6 Drawing Sheets

(56) References Cited

U.S. PATENT DOCUMENTS

| | | | | |
|---|---|---|---|---|
| 6,848,808 | B2 * | 2/2005 | Guerrieri | A45C 15/06 362/396 |
| 6,945,503 | B2 * | 9/2005 | Cohen | E04F 21/00 224/677 |
| 7,165,706 | B2 * | 1/2007 | Barr | A45C 7/009 224/661 |
| 7,389,899 | B2 * | 6/2008 | Johnson | A45F 5/021 224/675 |
| 7,950,554 | B2 * | 5/2011 | Hoffner | F41C 33/046 224/661 |
| 2003/0197042 | A1 * | 10/2003 | Warren | A45C 1/04 224/183 |
| 2003/0230615 | A1 * | 12/2003 | Jones | E04F 21/00 224/677 |
| 2008/0093406 | A1 * | 4/2008 | Logan | A45F 5/021 224/682 |
| 2009/0084694 | A1 * | 4/2009 | Agirbas | B65D 85/1045 206/268 |
| 2009/0255846 | A1 * | 10/2009 | Pires | A45C 5/005 206/581 |
| 2009/0314813 | A1 * | 12/2009 | Woolery | A45F 5/021 224/183 |
| 2011/0278195 | A1 * | 11/2011 | Giocastro | B65D 83/04 206/528 |
| 2012/0104057 | A1 * | 5/2012 | Gerrior | A45F 5/021 224/183 |
| 2015/0286117 | A1 * | 10/2015 | Sung | F16M 11/041 248/220.22 |
| 2017/0055687 | A1 * | 3/2017 | Diaz | A45F 5/021 |

* cited by examiner

SPACKLE KNIFE HOLSTER

CROSS REFERENCE TO RELATED APPLICATIONS

This application claims priority from provisional patent application No. 62/711,590, filed on Jul. 29, 2021, which is incorporated by reference herein.

BACKGROUND

The present invention relates generally to the field of construction tool accessories, in this case, an accessory for putty knives, joint compound knives, spackle knives, and spatulas. More specifically, the present invention relates to storing putty knives or spatulas during non-use and retaining them in a position for rapid and easy access during use.

The present invention is an apparatus for retaining spatulas, joint compound knives, spackle knives, putty knives, and the like so they can be quickly accessed and used during a construction project. Often during construction or remodeling of buildings, a contractor or tradesman will have the need to add a compound or plaster to an area of the wall. The tools commonly used for this purpose are putty knives or spatulas. For example, at a joint location between pieces of drywall, a user will typically use a spatula to apply a compound at the joint location and then not need to use the spatula for a period of time. During this time of non-use, the spatula or putty knife is typically laid down and not retained on the user's body to allow the user to use both hands to perform a secondary task. Then, when the need for the spatula arises again, the user picks up the spatula or putty knife and continues to apply compound or other desired material commonly applied by putty knives and spatulas.

There is a need for a device to carry and hold various sizes of spatulas and putty knives and thus stow multiple spatulas and putty knives for ease of access and rapidity of access while working on a construction project.

There is also a need for an apparatus that allows stowage of the spatula on a container retained on the person's body at a location to allow the user to more readily and easily transition from having a spatula or putty knife in a retained condition to obtaining and using the spatula or putty knife, and then returning the spatula or putty knife to the container during non-use.

SUMMARY

The present application discloses a spatula and putty knife holster, to stow and carry these construction tools while working on a construction project.

The inventions allow a user to store spatulas, putty knives, and the like, collectively called "spackle knives," on a container or holster retained on the person's body at a location allowing the user to more readily and easily transition from having a spatula or putty knife in a retained condition to obtaining and using the spatula or putty knife, and then returning the spatula or putty knife to the holster during non-use.

The present inventions also provide a spackle knife holster that retains the spackle knives during non-use. Magnets are positioned on an inner wall of the present invention and preferably separated by one wall to removably affix the spackle knives to the spackle knife holster.

In an embodiment, the present invention provides a spackle knife holster that retains the spackle knives during non-use. Magnets are positioned on an inner wall of the present invention and preferably separated by one wall to removably affix the spackle knives to the spackle knife holster. A protective cover pouch and spackle knife holster are provided that can accommodate multiple spatulas and putty knives.

In an embodiment, the present invention provides a plurality of compartments to retain a plurality of spackle knives. Each one of these compartments is preferably made of or lined with plastic to allow for easy cleaning. These compartments can comprise a rigid or pliable plastic.

In an embodiment, the present invention creates a container or spackle knife holster that retains a multiplicity of different sizes and types of spackle knives (e.g., spatulas and putty knives).

The present invention is an apparatus for retaining a multiplicity of spackle knives, the apparatus comprising:

a. a spackle knife holster including a pouch cover and a holster portion having at least two pockets with each pocket having an exterior wall, a pocket interior wall with the pocket interior walls and pocket exterior walls each defining a respective interior chamber for retaining a multiplicity of spackle knives;

b. the spackle knife holster including a first loop having a first opening sized to receive a belt worn around a user's waist;

c. the spackle knife holster including a second loop with a first loop opening sized to receive a strap passing through the first loop opening, the strap having a first end with a first closing member and a second end with a mating second closing member to enable the strap to be closed, d. the holster portion having a rear side wall having a rear surface containing a multiplicity of spaced apart magnet, each respective magnet retaining a metal blade of the multiplicity of spackle knives placed in an interior chamber of the holster portion, the magnet separated from the spackle knife holster by the holster rear side wall;

e. the first loop of said strap extended through a user's belt going on a user's waist so that the spackle knife holster hangs down from the user's waist against the user's leg;

f. the spackle knife holster including a second loop through which a second strap passes and is wrapped around the user's leg; and g. the spackle knife holster retained at an angle between a user's belt and the strap wrapped around the user's leg to enable the user to rapidly access putty knives retained within the spackle knife holster loop on a worker's belt to enable the spackle knife holster to extend downward from the belt adjacent a user's leg.

Further novel features and other objects of the present invention will become apparent from the following detailed description and discussion.

The disclosed innovations, in various embodiments, provide one or more of at least the following advantages. However, not all of these advantages result from every one of the innovations disclosed, and this list of advantages does not limit the various claimed inventions.

Increased productivity.

Ease of keeping track of spatulas and putty knives.

Multiple sizes and types of tools readily available.

BRIEF DESCRIPTION OF THE DRAWINGS

The disclosed inventions will be described with reference to the accompanying drawings, which show important sample embodiments of the invention and which are incorporated in the specification hereof by reference, wherein.

DETAILED DESCRIPTION OF SAMPLE EMBODIMENTS

Figure 1:
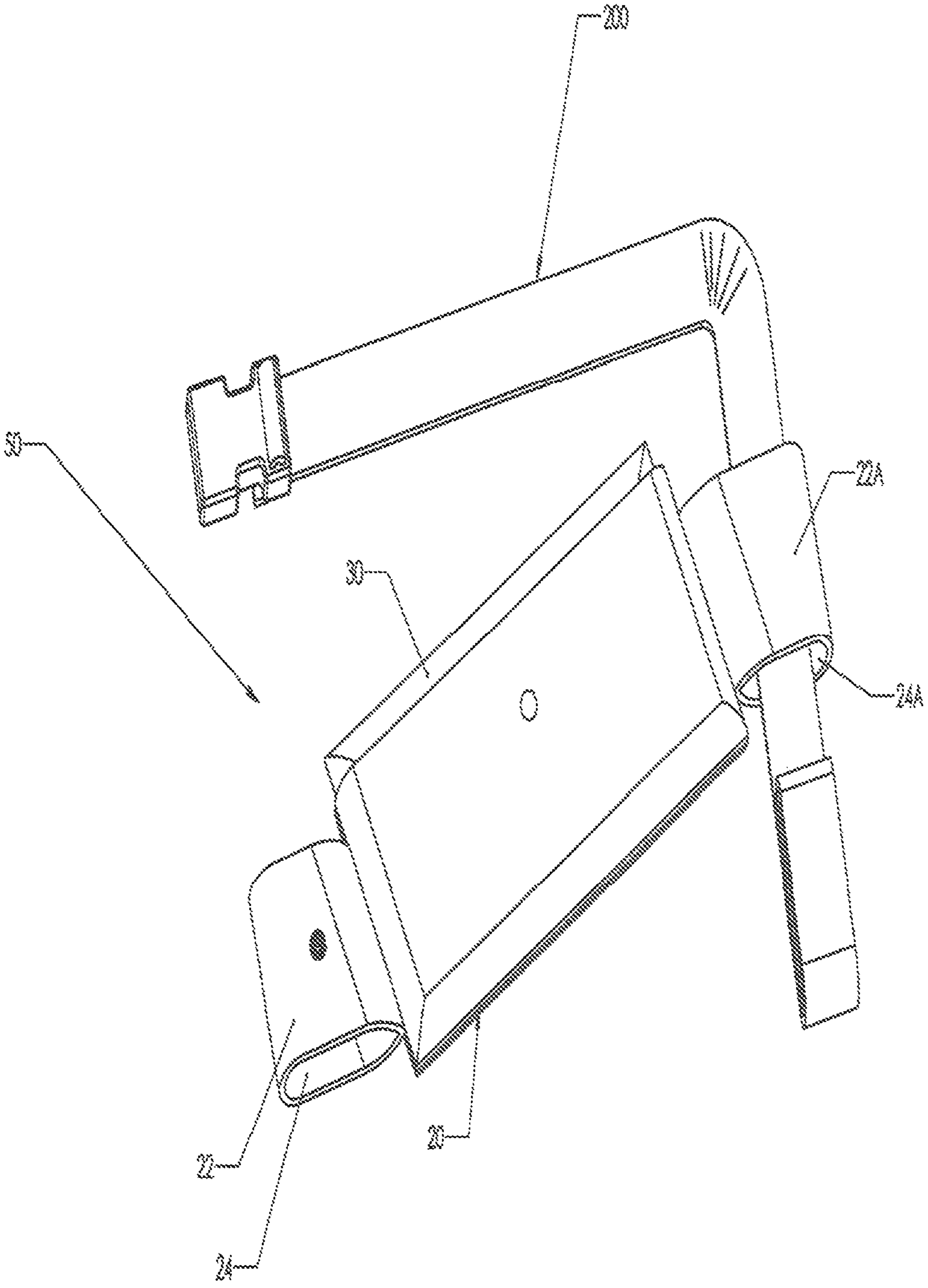
FIG. 1 is a top perspective view of the present invention spackle knife holster detached from a user's belt and illustrating a strap of the present invention passing through one of the loops.

The numerous innovative teachings of the present application will be described with particular reference to presently preferred embodiments (by way of example, and not of limitation). The present application describes several inventions, and none of the statements below should be taken as limiting the claims generally.

In the following discussion, numerous specific details are set forth to provide a thorough understanding of the present disclosure. However, those skilled in the art will appreciate that embodiments may be practiced without such specific details. Furthermore, lists and/or examples are often provided and should be interpreted as exemplary only and in no way limiting embodiments to only those examples.

Exemplary embodiments are described below in the accompanying Figures. The following detailed description provides a comprehensive review of the drawing Figures in order to provide a thorough understanding of, and an enabling description for, these embodiments. One having ordinary skill in the art will understand that in some cases well-known structures and functions have not been shown or described in detail to avoid unnecessarily obscuring the description of the embodiments.

Referring to FIGS. 1 through 4, there is illustrated the present invention spackle knife holster 50 which comprises a pouch cover 20 and a holster portion 30 having a plurality of compartments for retaining spatulas. When referred to in the patent and claims text, spackle knife refers to knives which are selected from the group consisting of putty knives, joint compound knives, spackle knives, spatulas, and the like, all of which are included by reference when the term "spackle knife" is used.

Referring to FIG. 1, as depicted, the spackle knife holster 50 has a pair of oppositely disposed belt loops 22 and 22A. Belt loop 22 has an opening 24, so that a user's belt about the waist can be fed through the opening 24 of belt loop 22, which is held in a higher position on the leg of a user versus loop 22A. Opening 24A of loop 22A allows a strap 200 to pass through, and strap 200 can then be fastened around a user's thigh.

Spackle knife holster 50 consist of a holster portion 30 and a pouch cover 20, and the two components fitted together effectively create the two-piece spackle knife holster 50 comprising pouch cover 20 and holster portion 30 into a single spackle knife holster. The spackle knife holster 50 thus can contain a plurality of pockets, and it also can contain a magnet or magnets to better retain inserted spatulas. The pouch cover 20 fits over the holster portion 30, with the holster portion 30 sliding into pouch cover 20 through open side 21, and retained in place either by friction or other fixation or retention devices, such as opposing hook and loop surfaces (Velcro®), snaps, or magnets paired together or with a metal surface attached thereto. A friction fit can be enhanced using opposing roughened surfaces, one on the exterior of holster portion 30 and one on the interior of pouch cover 20. However, numerous mechanisms can be employed as a retention device for the pouch cover 20 and holster portion 30 combo. In an embodiment, belt loop 22 and/or loop 22A located on pouch cover 20 can be integrally affixed to holster portion 30 to hold the two components together, such as by snaps or hook and loop fasteners. Further, in an embodiment, the holster portion 30 can comprise a rigid or pliable plastic and pouch cover 20 can comprise a heavy, durable fabric.

Figure 2:
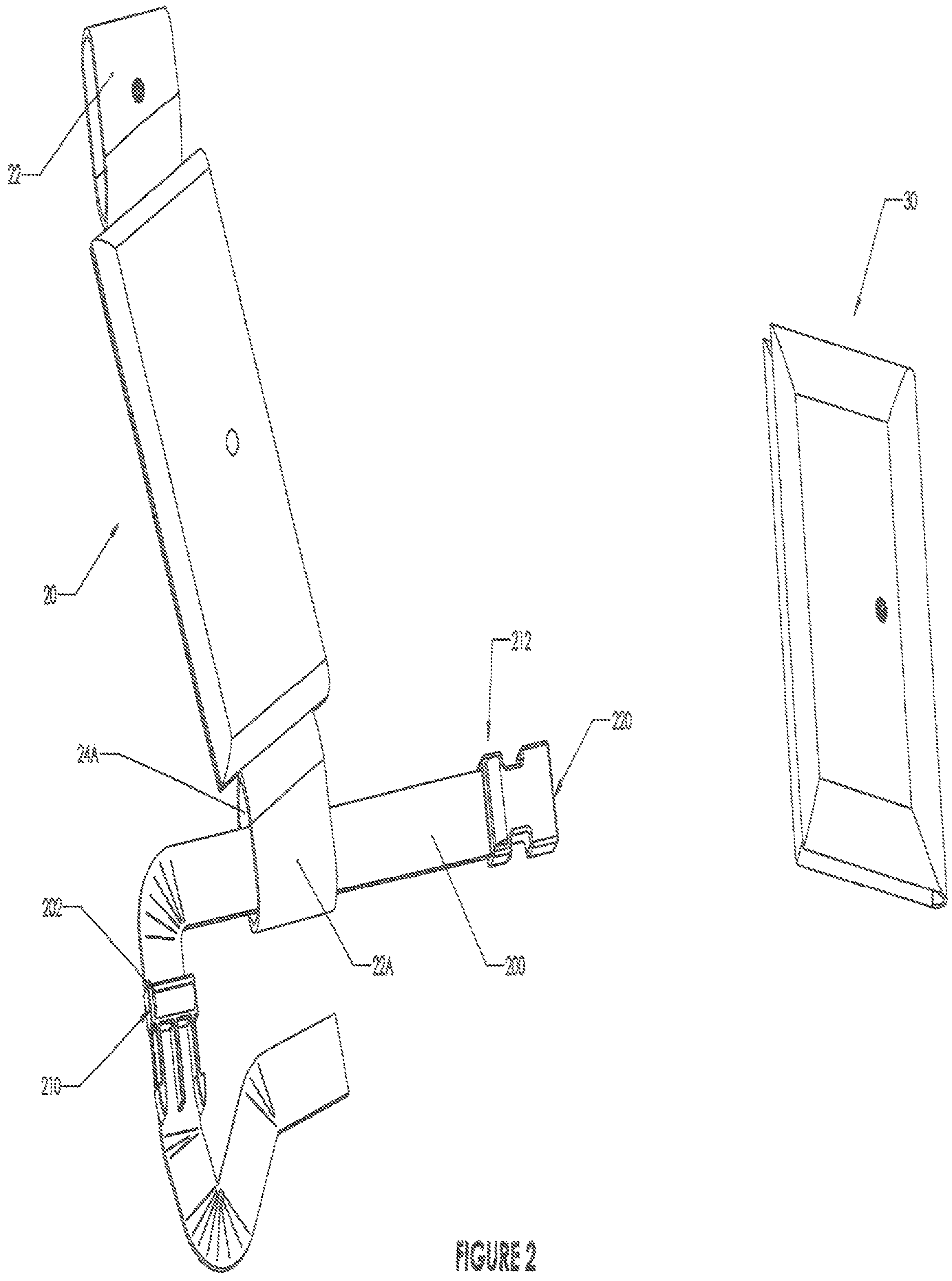
FIG. 2 is an exploded view of the present invention spackle knife holster detached from a user's belt and illustrating a strap of the present invention passing through one of the loops of the pouch cover for retaining the spackle knife holster.

As depicted in FIG. 2, holster portion 30 and pouch cover 20 are shown separated and apart, with the holster portion 30 shown with strap 200 inserted through opening 24A. Strap 200 passes through loop opening 24A of second loop 22A, the loop opening 24A sized to receive strap 200. The loop 22 and the leg strap/cord are positioned at complementary angles relative to holster portion 30.

The strap 200 has a first end 202 with a first closing member 210 and a second end 212 with a mating closing member 220 to enable the strap 200 wrap around the user's leg and then closed by mating first closing member 210 with mating closing member end 220. Because loops 22 and 22A are attached at angles on holster portion 30, the spackle knife holster 50 is secured at an angle relative to the user's body, so the inserted spackle knives can be quickly grasped by a user.

Figure 3:
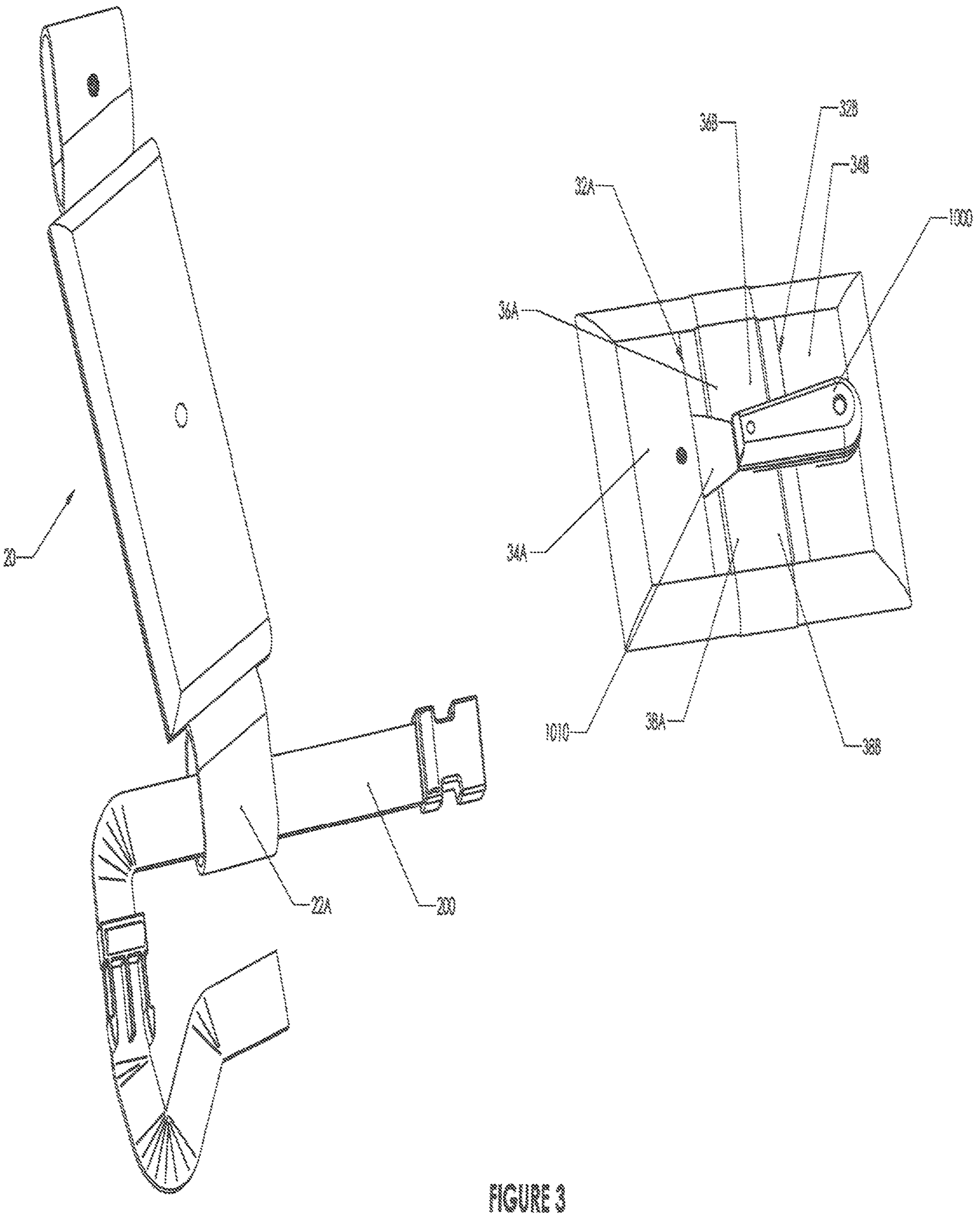
FIG. 3 is an exploded view of the present invention spackle knife holster detached from a user's belt and illustrating a strap of the present invention passing through one of the loops of the pouch cover for retaining the spackle knife holster and the spackle knife holster retaining a spatula.

As depicted in FIG. 3, the holster portion 30 of spackle knife holster 50 consists of at least two pockets 32A and 32B, with each pocket having an exterior wall 34A and 34B and a pocket interior wall 36A and 36B, with the pocket interior walls 36A and 36B and pocket exterior walls 34A and 34B each defining a respective interior chamber 38A and 38B for retaining a plurality of spackle knives. Illustrative spatula 1000 is depicted with blade 1010 inserted into interior chamber 38A.

Figure 4:
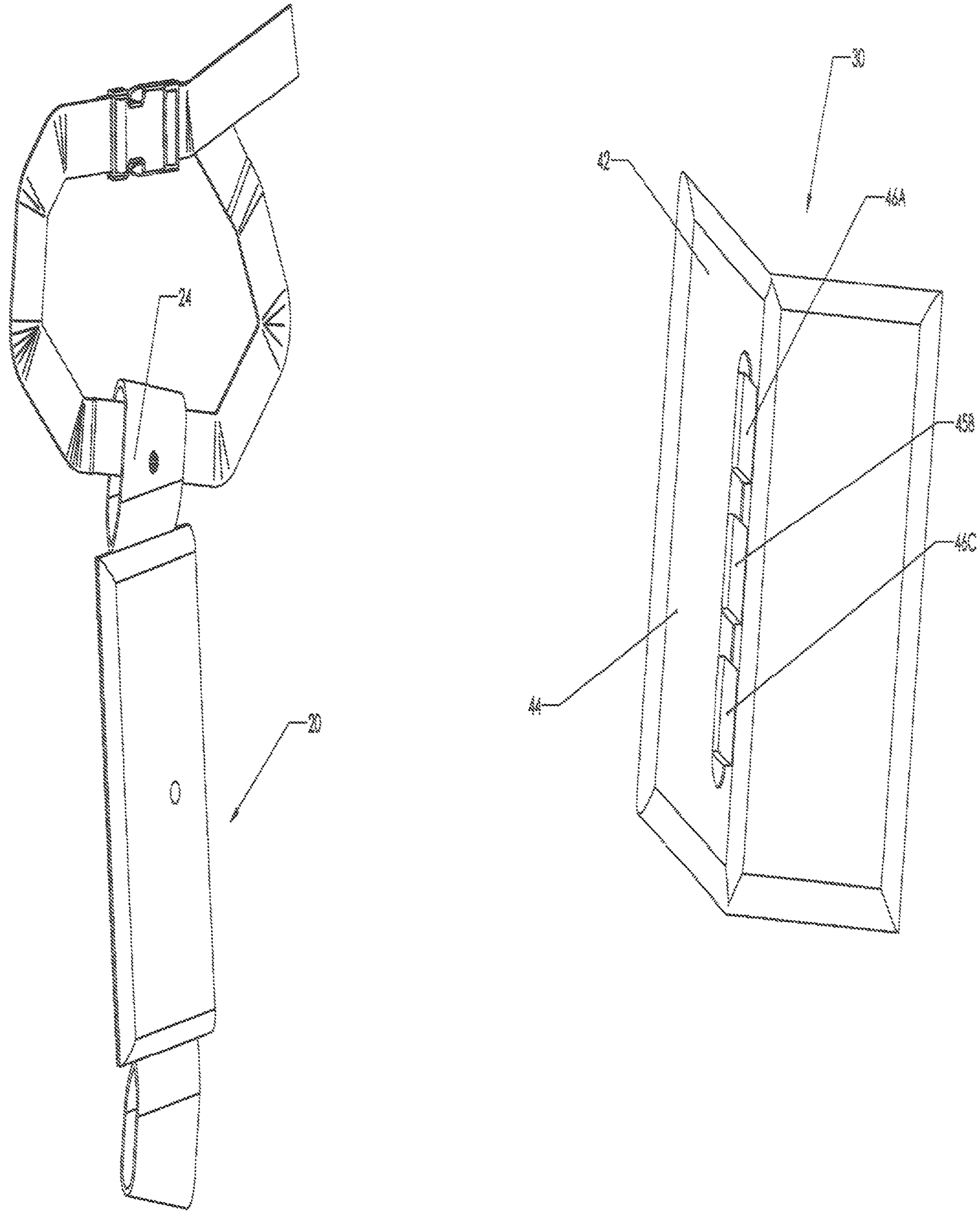
FIG. 4 is a bottom perspective view of the holster portion of the spackle knife holster detached from a user's belt and illustrating a strap of the present invention passing through one of the loops of the pouch cover.

Referring to FIG. 4, as depicted a rear side 42 of holster portion 30 has a rear surface 44, which can contain at least one magnet. As shown, a multiplicity of magnets 46A, 46B, and 46C can be positioned on rear surface 44. In operation, the magnets 46A, 46B, and 46C can help retain a plurality of spackle knives, such as spatula 1000 within holster portion 30 as shown in FIG. 3.

In use, referring to FIGS. 3 and 4, a spatula 1000 or other metal blade device can be withdrawn so as to overpower the magnetic force retaining a metal blade, such as blade 1010, and use it until the user decides to return the spatula 1000 to spackle knife holster 50 and become held in place by the magnetic force. Magnets, such as 46A, 46B and 46C, can be located on other areas of holster portion 30 to produce the same result, but preferably there is a wall between the magnets and the blade 1010 portion of the spatulas 1000 to reduce the magnetic force and allow the user to more easily remove the spatula for use.

In an embodiment, loop 22 located on pouch cover 20 can be integrally affixed to holster portion 30, effectively making two-piece spackle knife holster 50 comprising pouch cover 20 and holster portion 30 into a one-piece spackle knife holster. The one-piece spackle knife holster 50 can contain a plurality of pockets and contain a magnet or magnets to better retain the blades of the spackle knives.

Figure 5:
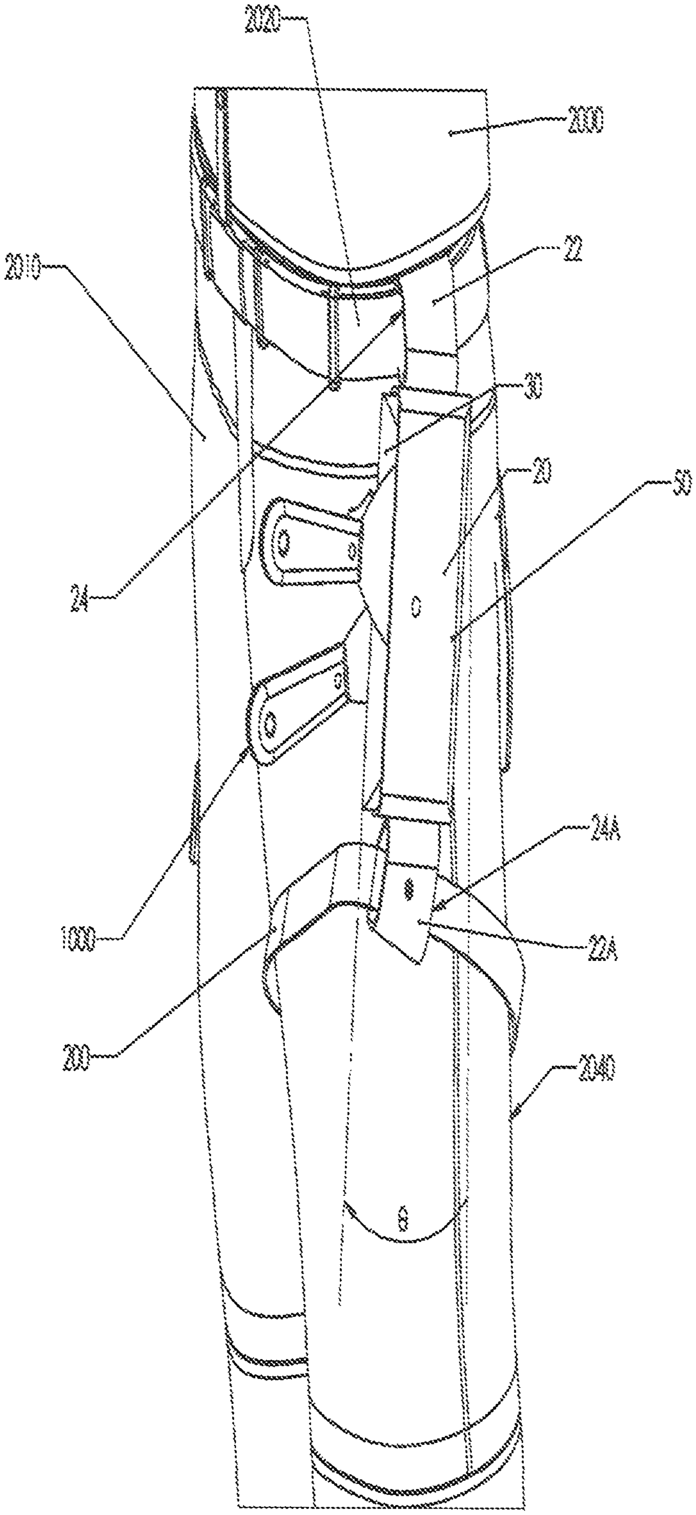
FIG. 5 is a perspective view of the present invention spackle knife holster in use and mounted to a user's belt loops.

Referring to FIG. 5, as depicted, there is illustrated a user 2000 with spackle knife holster 50 retained on a user belt 2020. The loop 20 is fed through a user's belt 2020 worn on a user's pants 2010 of user 2000. The opening 24 on belt loop 22 is fed through the user's belt 2020 to secure the holster 50.

Optionally, the second loop 22A can be used with a strap 200, or substituted by a tie cord (not shown), to help secure pouch cover 20 by wrapping strap 200 around user's leg 2040, with strap 200 passing through opening 24A. The use of the strap 200 around user's leg is optional. Further, an advantage of using both loops 22 and 22A in the two locations, one around the user's belt and the second around the user's leg, can retain the spackle knife holster 50 at an angle relative to the user's leg. In an embodiment, the angle θ can typically be between about 15° and 60° from vertical, and most preferably about 25° from vertical. This allows the user to easily place a spatula 1000 within the holster portion 30 and remove the spatula 1000 when desired. The angle θ can also assists in retaining the spatula 1000 within the holster portion 30 by the force of gravity.

The preferred materials for the pockets formed by holster portion 30 is plastic or other similar material that is easily cleaned. In an embodiment, the loop 22A can contain fasteners such as snaps, hook and loop fasteners, or other commonly known fasteners to fix strap 200 in place, which also contains corresponding fasteners such as snaps, hook and loop fasteners, or other commonly known fasteners to retain spackle knife holster 50 in a desired location.

Figure 6:
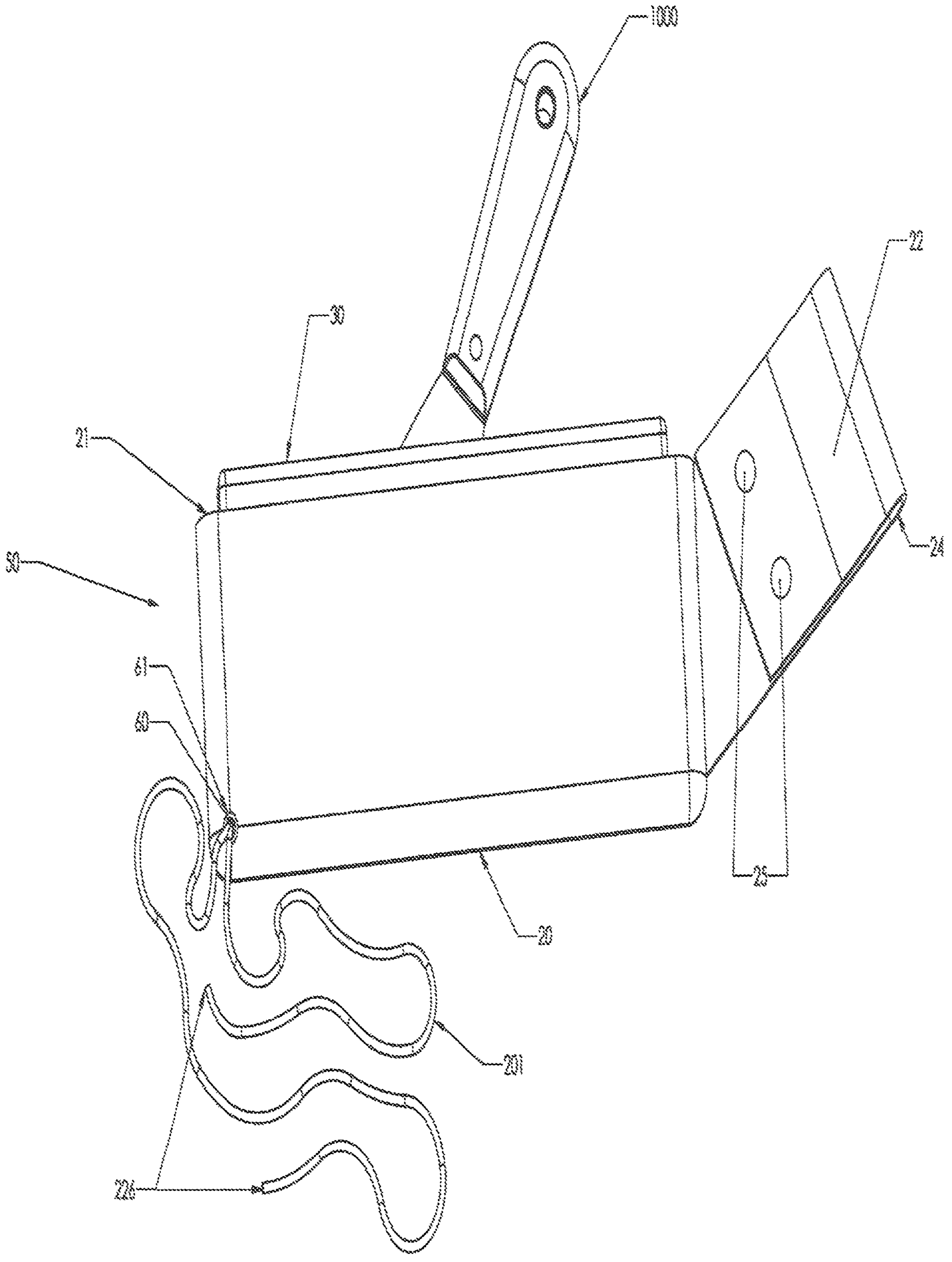
FIG. 6 is an alternative embodiment for the spackle knife holster pouch cover.

FIG. 6 depicts a preferred embodiment for spackle knife holster 50. As shown, pouch holster 20 comprises side opening 21 sized to receive holster portion 30, which as shown contains spackle knife 1000. An upper side of pouch holster 20 includes belt loop 22, which as depicted comprises a short strap folded over itself so two pair of fasteners 25 can fasten to form the belt loop 22. The resulting opening 24 can then accommodate a belt, and in operation the unfastened belt loop 22 can be passed underneath a worn belt and the pair of fasteners 25 the fastened together to form the belt loop 22.

The lower side opposite the upper side can include cord hole 60 reinforced by grommet 61 sized to receive a tie cord 201 passing there through. As depicted, the tie cord 201 is secured in place and comprises two ends 226. The length of tie cord 201 allows tie cord 201 to wrap around a leg of the user and then tied in place using the two ends 226 to secure the lower side of the pouch holster 20 in place on the leg. Tie cord 201 can be made from a fabric, synthetic or natural, or leather.

Insofar as the description above and the accompanying drawing disclose any additional subject matter that is not within the scope of the single claim below, the inventions are not dedicated to the public and the right to the one or more applications to claim such additional inventions is reserved.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The foregoing has described methods and systems for a putty knife or spackle knife holster that are given for illustration and not for limitation and uses. Thus the inventions are limited only by the appended claims. Although the inventions have been described in accordance with the embodiments shown, one of ordinary skill in the art will readily recognize that there could be variations to the embodiments and those variations would be within the spirit and scope of the present inventions. Accordingly, many modifications may be made by one of ordinary skill in the art without departing from the spirit and scope of the appended claims.

Particular terminology used when describing certain features or aspects of the embodiments should not be taken to imply that the terminology is being redefined herein to be restricted to any specific characteristics, features, or aspects with which that terminology is associated. In general, the terms used in the following claims should not be construed to be limited to the specific embodiments disclosed in the specification, unless the above Detailed Description section explicitly defines such terms. Accordingly, the actual scope of the claims encompasses not only the disclosed embodiments, but also all equivalent ways of practicing or implementing the claimed subject matter.

The above detailed description of the embodiments is not intended to be exhaustive or to limit the disclosure to the precise embodiment or form disclosed herein or to the particular fields of usage mentioned above. While specific embodiments and examples are described above for illustrative purposes, various equivalent modifications are possible within the scope of the disclosure, as those skilled in the relevant art will recognize. Also, the teachings of the embodiments provided herein can be applied to other systems, not necessarily the system described above. The elements and acts of the various embodiments described above can be combined to provide further embodiments.

Any patents, applications and other references that may be listed in accompanying or subsequent filing papers, are incorporated herein by reference. Aspects of embodiments can be modified, if necessary, to employ the systems, functions, and concepts of the various references to provide yet further embodiments.

In light of the above "Detailed Description," the Inventor may make changes to the disclosure. While the detailed description outlines possible embodiments and discloses the best mode contemplated, no matter how detailed the above appears in text, embodiments may be practiced in a myriad of ways. Thus, implementation details may vary considerably while still being encompassed by the spirit of the embodiments as disclosed by the inventor. As discussed herein, specific terminology used when describing certain features or aspects should not be taken to imply that the terminology is being redefined herein to be restricted to any specific characteristics, features, or aspects of the embodiments with which that terminology is associated.

While certain aspects are presented below in certain claim forms, the inventor contemplates the various aspects in any number of claim forms. Accordingly, the inventor reserves the right to add additional claims after filing the application to pursue such additional claim forms for other aspects.

The above specification, examples and data provide a description of the structure and use of exemplary implementations of the described systems, articles of manufacture and methods. It is important to note that many implementations can be made without departing from the spirit and scope of the disclosure.

MODIFICATIONS AND VARIATIONS

As will be recognized by those skilled in the art, the innovative concepts described in the present application can be modified and varied over a tremendous range of applications, and accordingly the scope of patented subject matter is not limited by any of the specific exemplary teachings given. It is intended to embrace all such alternatives, modifications and variations that fall within the spirit and broad scope of the appended claims.

Various materials may be used to construct the disclosed putty knife or spackle knife holster. For example, the pouch cover can be made from a plastic, or acrylic, heavy duty nylon, leather, or even a heavy weight cloth, such as canvas. Similarly, the holster can be made from similar materials, though it is contemplated that the holster will preferably be constructed from plastic, polymer, or heavy nylon or other synthetic cloth to facilitate clean up. The plastic or polymer material can be rigid or pliable.

Although in an embodiment, a two-piece holster is utilized, the basic design can be modified into a one-piece holster with two internal layers having a set of magnets imbedded therein between the layers to retain spatulas.

None of the description in the present application should be read as implying that any particular element, step, or function is an essential element which must be included in the claim scope: THE SCOPE OF PATENTED SUBJECT MATTER IS DEFINED ONLY BY THE ALLOWED CLAIMS.

Moreover, none of these claims are intended to invoke paragraph six of 35 USC section 112 unless the exact words "means for" are followed by a participle.

The claims as filed are intended to be as comprehensive as possible, and NO subject matter is intentionally relinquished, dedicated, or abandoned.

What is claimed is:

1. An apparatus for retaining a multiplicity of spackle knives, the apparatus comprising:

a. a spackle knife holster including a pouch cover and a holster portion having at least two pockets, with each pocket having a pocket exterior wall and a pocket interior wall, with the pocket interior walls and pocket exterior walls each defining a respective interior chamber for retaining a multiplicity of spackle knives, wherein the pouch cover comprises a retention mechanism including a retention magnet and a friction fit, wherein the friction fit includes first and a second opposing roughened surfaces, on the exterior of the holster portion and the interior of the pouch cover;

b. the spackle knife holster including a first loop having a first opening sized to receive a waist belt, wherein the first loop is configured to retain the spackle knife holster, wherein the spackle knife holster is positioned to hang down from the waist belt against a leg of a user;

c. the spackle knife holster including a second loop oppositely positioned from the first loop, with a second loop opening sized to receive a strap passing through the second loop opening, the strap having a first end with a first closing member and a second end with a mating second closing member to enable the strap to be closed, wherein the strap is configured to create a loop around the leg of the use;

d. the holster portion having a holster rear side wall having a rear surface containing a multiplicity of spaced apart magnets, each respective magnet configured for retaining a metal spackle knife blade placed in each interior chamber of the holster portion, the magnet separated from the spackle knife holster by the holster rear side wall, the rear side wall configured to separate the magnet from the pocket interior wall;

e. the spackle knife holster retained at an angle, by the first loop and the second loop, between the waist and the leg to enable the user to rapidly access spackle knives retained within the spackle knife holster extending downward from the waist adjacent the leg, wherein the angle is between 15° and 25° From vertical, wherein vertical is determined from the leg of the user.

2. The apparatus for retaining a multiplicity of spatulas and putty knives of claim 1, further comprising:

f. the spackle knife holster including a cord hole oppositely positioned from the first loop, with the cord hole sized to receive a tie cord passing through the cord hole, the tie cord having a first end and a second end and mated by tying the two ends together;

g. the spackle knife holster including the cord hole through which the tie cord passes and wraps around the leg.

3. The apparatus for retaining a multiplicity of spackle knives of claim 1, wherein:

the pouch cover comprises an opening for the holster portion to slide therein and said first loop includes at least one set of fasteners, said fasteners allowing the first loop to unfasten to form a strap to slip under said waist belt and then refasten into said first loop.

4. The apparatus for retaining a multiplicity of spackle knives of claim 3, wherein the pouch cover retains the holster portion via a retention mechanism.

5. The apparatus for retaining a multiplicity of spackle knives of claim 4, wherein the retention mechanism comprises at least one of:

a hook and loop fastener;

a snap; or a roughened surface.

6. A spackle knife holster, comprising:

a spackle knife holster including at least one internal pocket and a pouch cover with at least two layers, including an external layer forming an exterior surface of the spackle knife holster, and an internal layer forming an interior, innermost wall of the at least one internal pocket, wherein the at least one internal pocket is configured to receive a multiplicity of spackle knives, wherein the pouch cover comprises a retention mechanism including a retention magnet and a friction fit, wherein the friction fit includes first and a second opposing roughened surfaces, on the exterior of the holster portion and the interior of the pouch cover;

at least one magnet interposed between the external layer and the internal layer, and configured to retain a metal blade of the multiplicity of spackle knives when inserted into the at least one internal pocket via magnetism;

an opening on a lower side of the spackle knife holster sized to receive a leg strap or cord and configured so the leg strap or cord can be secured around the leg to secure a lower end of the spackle knife holster to said leg; and the spackle knife holster including a belt loop sized to receive a waist belt and positioned where the spackle knife holster hangs down from the waist at an angle against and adjacent to a leg, wherein the spackle knife holster is retained at an angle by the leg strap or cord, wherein the angle is between 15° and 25° from vertical, wherein vertical is determined from the leg of the user.

7. The spackle knife holster of claim 6, wherein the pouch cover receives the holster portion slid into the pouch cover through an opening and retained therein via a retention mechanism.

8. The spackle knife holster of claim 6, wherein the retention mechanism comprises at least one of:

a hook and loop fastener;

a snap; or a roughened surface.

9. The spackle knife holster of claim 6, wherein the holster portion and the at least one internal pocket further comprises two internal pockets, with each pocket having a pocket exterior wall, a pocket interior, innermost wall, with the pocket interior, innermost walls and pocket exterior walls together each define a respective interior chamber for retaining a multiplicity of spackle knives therein.

10. The spackle knife holster of claim 6, wherein the angle is between 200 degrees and 250 degrees from vertical.

11. The spackle knife holster of claim 6, wherein the at least one internal pocket comprises a plastic or polymer.

12. A system for stowing and carrying a multiplicity of spackle knives, comprising:

an exterior pouch cover with an interior compartment accessed by an opening therein configured to receive an internal holster portion and including a first retention device to retain the inserted holster portion therein, wherein the pouch cover comprises a retention mechanism including a retention magnet and a friction fit, wherein the friction fit includes first and a second opposing roughened surfaces, on the exterior of the holster portion and the interior of the pouch cover;

the exterior pouch cover further comprises an opening on a lower side sized to receive a leg retainer and configured so the leg retainer can be secured around a leg when in use;

the internal holster portion comprising at least one internal pocket and configured to receive a multiplicity of spackle knives and to interact with the first retention device to retain the holster portion inside the pouch cover, and the internal holster portion further comprising a second retention device to retain said multiplicity of spackle knives inserted therein; and a belt loop positioned on an upper side of the exterior pouch cover sized to receive a waist belt and positioned such that the exterior pouch cover hangs down at an angle, retained by the leg retainer, from the waist belt when in use, wherein the angle is between 15° and 25° from vertical, wherein vertical is the determined from the leg of the user, wherein vertical is the determined from the leg of the user, and the belt loop and a second loop created by the leg retainer, are positioned at complimentary angles relative to the holster portion as positioned on the thigh of the user.

13. The system for stowing and carrying a multiplicity of spackle knives of claim 12, wherein the internal holster portion comprises two internal pockets with a plastic or polymer internal surface with each internal pocket including a magnet retention device configured to interact with a metal blade of each said multiplicity of spackle knives inserted therein in contact with said internal surface.

14. The system for stowing and carrying a multiplicity of spackle knives of claim 12, wherein the first retention device comprises at least one of:

a hook and loop fastener;

a snap; or a roughened surface.

15. The system for stowing and carrying a multiplicity of spackle knives of claim 12, wherein the angle is between 20 degrees and 25 degrees from vertical.

16. The system for stowing and carrying a multiplicity of spackle knives of claim 12, wherein the belt loop comprises a fabric strap secured into a loop by at least one pair of fasteners.

* * * * *